US007827283B2

(12) United States Patent
Naik et al.

(10) Patent No.: US 7,827,283 B2
(45) Date of Patent: Nov. 2, 2010

(54) SYSTEM FOR MANAGING AND CONTROLLING STORAGE ACCESS REQUIREMENTS

(75) Inventors: Vijay K. Naik, Pleasantville, NY (US); Vitthal Mahadeo Gogate, Los Altos, CA (US); Divyesh Jadav, San Jose, CA (US); Inderpal Singh Narang, Saratoga, CA (US); Prashant Pandey, Fremont, CA (US); Upendra Sharma, New Delhi (IN); Pradeep Varma, New Delhi (IN); Nagraj Alur, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2377 days.

(21) Appl. No.: 10/367,444

(22) Filed: Feb. 19, 2003

(65) Prior Publication Data
US 2004/0205206 A1 Oct. 14, 2004

(51) Int. Cl.
*G06F 15/16* (2006.01)
*G06F 12/00* (2006.01)
(52) U.S. Cl. ................... 709/226; 709/250
(58) Field of Classification Search .......... 707/10, 707/202, 204; 379/221.01; 711/162, 112, 711/114; 714/6; 719/318; 709/225–229, 709/217–218, 250
See application file for complete search history.

(56) References Cited

U.S. PATENT DOCUMENTS 6,173,374 B1 * 1/2001 Heil et al. ........... 711/148
6,473,794 B1 * 10/2002 Guheen et al. ........... 709/223
6,622,221 B1 * 9/2003 Zahavi ........... 711/154
6,961,834 B2 * 11/2005 Weber ........... 711/169

OTHER PUBLICATIONS

Design and Implementation of SCSI target for Storage Area Networks, Palekar, A.A, et. al., May 2001.*
Network Attached Storage Architecture, Gibson, G.A., et. al., Comm of the ACM, vol. 43, No. 11, Nov. 2000.*
GridOs: Operating Systems Services for Grid Architectures, Padala, P., et. al., HiPC 2003, LNCS, Springer-Verlag Berlin.*
IBM TotalStorage NAS Advantages of the Windows Powered OS, Tretau, R., Redbooks paper, IBM, 2002.*

* cited by examiner

*Primary Examiner*—Zarni Maung
(74) *Attorney, Agent, or Firm*—Thomas A. Beck; Daniel P. Morris

(57) ABSTRACT

A Resource Management and Reservation System (RMRS) for managing and reserving storage bandwidth, is a platform independent middleware layer that provides an interface to applications, their database management systems, or some other higher level data management systems like ADRS which does data management on behalf of the applications. RMRS is highly relevant in hosted environments where one or more applications may be run on behalf of multiple customers each with a unique service level agreement with the Service Provider. Through its interface to the aforementioned applications, RMRS allows each application or an application side management system to communicate expected future storage access requirements (e.g., periodic access for backups). The interface also allows applications to request urgent storage access (e.g., recovery actions may be requested without being planned ahead of time).

42 Claims, 4 Drawing Sheets

SYSTEM FOR MANAGING AND CONTROLLING STORAGE ACCESS REQUIREMENTS

BACKGROUND OF THE INVENTION

1. Field of the Invention

The present invention relates generally to the field of storage access in a storage area network (SAN).

More particularly the invention comprises a novel system referred to hereinafter as the Resource Management and Reservation System ("RMRS") which employs a stand-alone autonomic system for managing, on-line planning of, scheduling and controlling storage access requests.

2. Description of the Prior Art

In the typical application-hosting environment in use today, a storage area network (SAN) service is shared among multiple applications.

For example, application servers are the intermediary between back-end databases and front-end user interfaces. The application servers pull the information requested by a user from the databases, process the data using some business logic and then transmit the processed data to the user interface which then presents it to the user in a human understandable format.

Each application may use a database system, which in turn may access the storage area network service for multiple purposes; such purposes being, for example, access for normal database transactions (i.e., normal on-line transaction processing or "OLTP" workload), backups, recovery, replication and so on. From an application point of view, each type of request has a certain relative priority. Within a sequence of accesses, the types of "requests" are not correlated.

Further, in a hosted environment, the hosting service provider may have multiple grades of service level agreements (hereinafter "SLA") with customers and the customers may use one or more hosted applications. Thus, a storage access request (e.g., a backup request) from one application may need to be prioritized higher than the similar type of request from another application depending on the customers being served. Storage access requests from two instances of the same application may also need to be differentiated depending on the quality-of-service guarantees given to the customer of each application instance.

Since the current storage service is shared, allocating its bandwidth among different types of accesses from multiple applications requires complex scheduling. Classical approaches used in operating systems or storage subsystems handle this type of complexity by classifying processes or applications into a few manageable classes. Policies are then applied to manage resource contentions and scheduling issues. However, changes in the workload observed in the hosted environment are much more dynamic and traditional approaches tend to be too complex or ineffective or expensive.

Another approach is to manage the complexity from the applications or from the database management systems. However, the commercial off-the-shelf applications or the underlying database management systems are not capable of managing this complexity. The level of customization required to handle die dynamic nature of the hosting environment can be prohibitively expensive. Besides, the business model in hosting environments is providing low cost solutions using economy of scale. Any massive customization effort can defeat the purpose of providing hosted services.

Today, in most instances in storage access requests, actions taken by the RMRS are performed manually by administrators. This approach limits the number of applications that can be managed at a time and limits the extent to which the bandwidth allocation can be optimized.

In summary, in a hosted environment, the business model requires Service Providers (SP) to share the common infrastructure and resources across multiple applications. Storage Area Network (SAN) is used as large shared storage among multiple hosted applications. It is very important for a service provider to optimize the use of (potentially limited) resources across multiple hosted applications depending on their priorities and resource availability. This helps service providers in offering cost-effective solutions to multiple customers. However, it also makes it easier to meet the service level agreements for individual customers in case of resource contentions according to their class of service.

Availability is an important requirement for hosted e-Business applications. Data Recovery, Data Replication are some of the important aspects of application data management which play a key role in governing the high availability requirements of critical customer applications. In many instances, these are "must-provide" kind of services. Data Recovery, Replication services involve heavy storage accesses and so need a good planning to achieve better Quality of Service. We illustrate the use of RMRS service in the context of Data Recovery. Presently Data Recovery is mostly handled manually by system administrators. It involves periodic scheduling of backup tasks and initiation of recovery in case of application crash or data corruption. Existing backup/recovery solutions automate the process up to a certain extent. Traditional centralized backup servers (e.g. IBM Tivoli Storage Manager) try to manage the periodic backups across multiple applications and unexpected recovery jobs with no real time knowledge of the state of utilization of the relevant shared resources like storage bandwidth, network bandwidth etc. This can result in period of high contentions for network and storage bandwidth, followed by periods of underutilization of the available resources. Thus, both starvations as well as low resource utilization are observed repeatedly in the same environment. Further, unplanned overlap of multiple backup and recovery jobs may significantly affect the recovery time objective of the applications.

Application availability is one of the important customer business objectives where data recovery plays a crucial role. Recovery of data from storage subsystems becomes necessary under a variety of conditions, for example, when the on-line data is detected to be corrupt or when an application crashes. There are three types of data recovery schemes:

1. Crash recovery: When an application terminates abnormally and leaves the data source in an inconsistent state, crash recovery becomes necessary. When the application comes back up, it needs to verify the logs and bring back the data source to a consistent point. For example, in case of database, it rolls back all the incomplete transactions at the time of crash. In this case, there is no need of restoring the data from previous backup image. In spite of that, a crash recovery is an I/O intensive operation since it needs to go through the entire active logs to verify consistency and, if required, logs need to be recovered from archives if they are not available locally.
2. Media recovery: When media (e.g., disk drive) fails or corrupts the online application data, then the data needs to be restored on a new media from a copy of the data. For example, in case of databases, if media fails then all the corresponding table spaces need to be restored from the previous backup and then rolled forwarded to the end of the log, to make them consistent with other data in database.

3. Logical Data Recovery: When application itself corrupts the data due to misbehavior or bad application logic, this type of recovery becomes necessary. In such case, it mostly requires the complete data source (database) to be restored from the previous backup image.

The following are some of the present state of the art commercial solutions, which provide enterprise class backup/recovery services.

1. IBM's Tivoli Storage Manager Data Protection Solution. (http:/www-3.ibm.com/software/tivoli/products/storage-mgr/)
2. SUN Solstice Backup Solution. (http://www.sun.com/storage/software/data_services/backup/)
3. Legato NetWorker Data Protection (http://portal2.legato.com/products/networker/)
4. VERITAS NetBackup Data Protection Solution. (http://www.veritas.com/products/category/ProductCatecgory.jhtml?categryId=2003&baseId=2021)

Most of these systems are based on the standard client-server architecture where central backup/storage server interacts with multiple backup clients that are designed for individual platforms, applications & data sources (e.g. Tivoli Data Protection clients for SAP R/3/DB2/Oracle on NT/Unix platforms etc.).

IBM's Tivoli Storage Manager's functionality as a representative of existing state of the art solutions is mentioned above. Tivoli Storage Manager (TSM) consists of three main components, TSM Server, TSM Client, and TSM Admin GUI.

TSM Server builds the data management backbone by managing storage hardware, providing secure environment, automating client and admin schedules, providing central management and administration to enterprise client applications through reporting, monitoring and logging of application's data objects inventory in the local database repository.

TSM provides primitive centralized scheduling ability to automate the execution of two types of schedules: 1. Client Schedule consisting of operations such as periodic backup/archive or unexpected recovery. 2. Administrative Schedule consisting administrative tasks that need to run on server e.g. storage pool migration, reporting, and so on. Administrators are required to setup the schedules for backups by specifying the backup command/script, when to execute, how often to run and how long it takes to run the command. It is important to note in the context of current invention that TSM does not consider the fact if command (backup) takes longer than specified time period due to resource contention, which may potentially affect the next scheduled operation that depend on it. TSM Client can either periodically poll with server to get the scheduled start time for its backup/archive events or TSM Server can notify client just before the scheduled start time of the event.

TSM allows application clients to associate with different service classes called policy domains. TSM Server manages multiple policy domains. Application client nodes need to register in a policy domain. Set of operational management policy rules apply to the group of clients in the policy domain. TSM currently uses the policy domains to group the clients according to their operational management requirements. It does not associate any Quality of Service policies to prioritize or differentiate the clients based on their Service Level Agreements.

TSM Client along with application specific extensions (e.g. Tivoli Data Protection for SAP R/3) executes the backup/recovery tasks on the application nodes as per the defined schedule. Web based GUI allows remote administration and setup of TSM Client and Server.

TSM optional software extension (presently: http://www-3.ibm.com/software/tivoli/products/storage-mgr-san/) allows SAN-connected computers to use the SAN for data protection data movements. So the bulk of the data transfer for backups or archives can either be done directly to TSM Server (over LAN) and which in turn stores the data on the offline storage or data can be directly transferred to storage devices over the Storage Area Network (SAN) without impacting Local Area Network (LAN) and CPU utilization on the application hosts.

Optional software extension for Hierarchical Space Management (HSM) (presently: http://www-3.ibm.com/software/tivoli/products/storage-mgr-space/) allows TSM Client to periodically move application's inactive data to less-expensive offline storage or near-line storage (over LAN or SAN), freeing online disk space for more important active data. We see an important need for generating the efficient resource optimal schedule for such periodic data movements as well.

In summary, the existing solutions simplify, centralize, and automate data protection for multiple enterprise applications across various heterogeneous platforms and data sources. They provide tools for database administrators (DBA) that help manage the backup and recovery tasks. However, none or these solutions are intelligent or autonomic in terms of generating efficient schedules for backup/recovery for optimizing the storage accesses in a central consolidated (like SAN) storage environment which proves useful for both applications as well as service providers. Further, we are not aware of any other system that can manage the backup and recovery tasks across multiple hosted applications in an autonomic manner by adapting to the changes in resource usage demands In addition, the existing solutions do not provide assistance in aggregated capacity planning, reservation and scheduling of network and storage resources. In a hosted environment, where the infrastructure is shared, demand aggregation over the entire suite of backup/recovery tasks is important. However, existing solutions do have the capabilities to handle the required aggregation for capacity planning. This is an important need identified in the vision of vendor neutral "Shared Storage Model" put forth by Storage Networking Industry Association (SNIA presently at: www.s-nia.org). RMRS consolidates this important requirement and provides that as a service to backup/recovery systems mentioned above, which presently focuses mainly on automating the backup/recovery process.

Though it is clear that a system such as the one described in this invention is essential for managing various types of storage accesses, for the sake of illustration we focus on backup/recovery type of data accesses. Also here after, in this document, TSM and other similar centralized control servers, which manage the application data transfers for Data Protection are referred to as "Application Data Recovery Servers (ADRS)."

For intelligent scheduling of the backup and recovery tasks on the storage subsystems, ADRS interacts with RMRS, which is a centralized web based system for managing the storage accesses across multiple I/O intensive backup & recovery tasks. Normally backups are relatively low priority tasks and periodic in nature and hence very well suited for advance resource reservation. Recovery tasks are high priority tasks and mostly unpredictable in nature and require immediate allocation of bandwidth and storage resources. ADRS assigns unique priorities to tasks based on the task types (backup, recovery etc.) and applications and customers associated with the I/O tasks (depending oil the policy domain to which customer/application is associated with).

ADRS and RMRS together achieve the level of automation needed to manage the storage requirements of a large-scale hosted environment.

One of the objectives of ADRS is to provide reservation and capacity planning tools to Service Providers. Service Providers need such tools in provisioning and pricing purposes. The reservation and planning tools are needed to regulate and optimize the storage accesses for I/O intensive tasks like backup/recovery/OLTP workloads across multiple hosted applications and avoid the need for over resource provisioning.

The instant invention provides the means to achieve the objective mentioned above. The system (RMRS) described in the current invention does the advance reservation and priority based scheduling of the storage bandwidth across multiple application's I/O intensive tasks like backup and recovery. As described in detail in the embodiment section hereinafter, RMRS exposes a well-defined client interface for the systems such as ADRS. Using this interface, ADRS negotiates the storage bandwidth allocation with RMRS, on behalf of the applications it manages. ADRS registers with RMRS the I/O tasks such as backup/recovery for each application, along with other attributes such as the task priority, expected storage bandwidth, task frequency and so on. ADRS then requests RMRS to generate an optimal schedule for periodic tasks like backups or requests immediate scheduling for high priority tasks such as a recovery task. RMRS keeps track of the storage bandwidth utilization across multiple applications and effectively schedules the bandwidth across the backup/recovery tasks in their specified time constraint windows while minimizing the contention for the bandwidth resource. Since RMRS manages the bandwidth utilization taking into account the demands from the entire set of applications, it has the ability to advise the ADRS on additional bandwidth provisioning required whenever a new customer is signed on or when a new application task is registered. Thus, RMRS is an important complementary component of ADRS, helping ADRS to achieve the customer's business objectives as well as helping service providers in optimizing their resource usage.

In another possible scenario, as opposed to the one described above where central control server (like ADRS) talks to RMRS on behalf of managed client applications, the client applications can directly interact with RMRS using RMRS client interface Legacy applications which can not change their application logic can talk to RMRS through the representative agents like TSM backup/archive clients to effectively schedule the backup recovery jobs in a shared hosted or enterprise network environment. Applications can specify the required parameters like backup frequency, expected storage bandwidth (based on expected runtime and data size), priority and time constraint windows in which backup should (or should not) be scheduled. Applications can obtain their relative priorities based on their associated policy domain or management class corresponding to their Service Level Agreements with service provider. (RMRS can potentially operate without relative application priorities where it can play a role more in maximizing the usage of storage bandwidth across multiple application requests.)

In the absence of the services provided by RMRS, ADRS would lack in the crucial functionality of priority based resource reservation and scheduling for backup/recovery tasks which are I/O intensive data movement tasks.

It would be difficult for ADRS to provide quality of service guarantees on the application recovery time objective as well as on the OLTP performance. The OLTP performance may very well be affected by periodic backup jobs. Provisioning of excessive network/storage bandwidth may eliminate the need of RMRS, but that would be an expensive solution for a service provider and also it does not support an emerging trend of Business on Demand in service oriented architecture e.g. IBM's business on Demand initiative (presently: http://www-1.ibm.com/service/ondemand/index_flash.html).

To provide the resource reservation and task scheduling and planning services, RMRS makes use of a scheduling component. As described in the embodiment, this component models the problem as an optimization problem and produces optimum or near optimal solutions that meet the defined objectives.

A large body of work exists in the literature that addresses the problems associated with resource scheduling and planning. In particular, in recent years much work has been done in the context of grid computing that is relevant to the planning and scheduling problem addressed by RMRS. [For an overview of grid computing, see "The Anatomy of the Grid: Enabling Scalable Virtual Organizations," I. Foster, C. Kesselman, S. Tuecke. *International J. Supercomputer Applications*, 15(3), 2001, the contents of which are hereby incorporated by reference herein. Presently available at http://www.globus.org/research/papers/anatomy.pdf]

As grid concepts revolve around the resource sharing and collaborative computing using widely distributed heterogeneous, independently administered resources, where the distributed resource management becomes a key requirement.

Scheduling with Advance Reservation and co-Allocation of resources help achieve end to end Quality of Service (QoS) for grid applications. [See: "Globus Architecture for Reservation and co-Allocation (GARA)] A Distributed Resource Management Architecture that Supports Advance Reservations and Co-Allocation," I. Foster, C. Kesselman, C. Lee, K. Lindell, K. Nahrstedt, A. Roy. *Intl Workshop on Quality of Service*, 1999, the contents of winch are hereby incorporated by reference herein. (presently available at http://www.globus.org/documentation/incoming/iwqos.pdf). This disclosure proposes the uniform framework that enables the construction of an application level co-reservation and co-allocation libraries that applications can use to dynamically assemble collections of heterogeneous resources, guided by application's quality of service requirements and local administration policies of individual resources. An end-to-end Bandwidth Reservation in IP networks using central bandwidth broker and a set of cooperating resource managers is described in *QoS as Middleware: Bandwidth Reservation System Design*," G. Hoo, W. Johnston, I. Foster, A. Roy, *Proceedings of the 8th IEEE Symposium on High Performance Distributed Computing*, pp. 345-346, 1999, (available at http:/www.globus.org/documentation/incoming/hoo.pdf), the contents of which are hereby incorporated by reference herein.

The schemes mentioned above and in most other grid related literature require co-allocation and co-scheduling of resources. This means multiple resources are reserved for simultaneous use by the grid applications. This implies synchronization among the resources and their use in a batch mode. Many types of resources and many types of applications benefit from the approaches described in the above referenced articles. However, in the context of storage subsystems, which are of prime concern to RMRS, effective and systematic time-sharing of a storage resource is a key for achieving high utilization and for avoiding hot spots caused by contention for bandwidth. Explicit synchronization among storage resources is not desirable for the storage access patterns and the types of applications managed by ADRS. In this important aspect, the approach taken by RMRS differs from the grid resource allocation work.

Many of the scientific and commercial grid applications require an efficient access to very large data sets in the range of tera/peta bytes. Data Grid addresses this problem by enabling the storage consolidation across widely distributed and independently managed heterogeneous storage systems (e.g. RAID Servers, SAN, NAS based file systems etc.) and providing core infrastructure services to manage the metadata and data (e.g., Metadata catalog service, data replication service, replica location service and so on).

The focus of RMRS in the current invention is more on resource management for network based storage (such as SAN) in terms of dynamic discovery, reservation and allocation of storage resources. RMRS on behalf of one or more Storage Servers exposes this ability using standard Web Service Interface. It essentially enables individual Storage Server(s) or subsystems to participate in a GARA like distributed reservation and co-allocation framework and also make them compliant for Open Grid Services Architecture (OGSA). This open grid services architecture is described in *The Physiology of the Grid: An Open Grid Services Architecture for Distributed Systems Integration*, I. Foster, C. Kesselman, J. Nick, S. Tuecke, *Open Grid service Infrastructure WG*, Global Grid Forum, Jun. 22, 2002, (presently available at http://www.globus.org/research/papers/ogsa.pdf), the contents of which are hereby incorporated by reference herein.

In addition to planning and scheduling I/O requests, the instant invention also describes managing and controlling bandwidth and storage subsystem resources. The embodiment describes controlling of resources belonging to a SAN subsystem. In a co-pending patent application bearing IBM Disclosure ARC9-2002-0010 entitled A Method for Improving Performance in a Computer Storage System by Regulating Resource Requests from Clients, the contents of which are hereby incorporated by reference herein, an invention is described that facilitates the controlled concurrent utilization of resources in a shared storage system.

In the system described in the invention, I/O requests are examined before and after they are serviced for monitoring resource usages and for regulating the different I/O streams to provide differentiated service.

The system provides performance guarantees to multiple I/O streams sharing the same storage system by controlling the rate at which requests from an I/O stream are issued to the back-end, thus regulating the amount of back-end resources being used by an I/O stream. The invention is not application-aware and any changes in application requirements have to be communicated to it explicitly. The invention also does not describe any mechanisms to distinguish different types of I/O tasks (e.g., OLTP request vs. backup request). Generic I/O tags could be used for this purpose, but it would be cumbersome solution.

For example, if a backup application runs for an hour everyday, an administrator will, have to explicitly configure the system to assign resources to the backup's I/O stream before the backup is taken. After the backup is taken, the administrator will have to reconfigure the system to revoke the resources assigned to the backup's I/O stream, The administrator could also assign resources to the backup permanently and not have the resources available to other applications even when the backup is not running.

Further, the aforementioned application does not describe how the I/O stream control mechanism can be used to allocate resources for multiple recurring backup tasks whose start times are variable but which need to complete within a certain time-window.

The system described above in IBM patent application disclosure ARC9-2002-0010 has a concept of service classes that can be used to provide some of the functionality provided by RMRS; e.g., the ability to distinguish among multiple clients. The notion of service classes is not sufficient for planning or reservation purposes, but it can be used to distinguish clients from one another. It is important to note that the same client can have multiple I/O tasks with different priorities (e.g. backup vs. recovery). It would be unrealistic to assume that all the tasks of higher class client are more important than all the tasks from lower class client; e.g. recovery task from a lower class client could be more important than backup task of a higher class client. RMRS facilitates such task level prioritization over to more static class based approach.

RMRS can function on top of any shared storage system, which allows monitoring and control of I/O streams based on the application requirements. The system described in the above mentioned patent application (i.e., IBM patent application disclosure ARC9-2002-0010) allows this kind of control to be available for networked storage systems like SAN and NAS. Thus, RMRS and the system described in IBM patent application disclosure ARC9-2002-0010 complement each other, and together they facilitate policy-based and application-oriented resource planning and allocation.

SUMMARY OF THE INVENTION

This present invention isolates the task of storage access management and provides an abstraction so that the problem of storage bandwidth allocation can be planned in advance taking into account priorities and the storage accesses from multiple tasks can be scheduled and monitored for performance realization.

The system of the present invention described herein provides feedback to the SAN manager so that the SAN performance can be tuned for bandwidth delivery in soft-real time. The system also analyzes scheduling decisions overtime to come up with more optimal plans for future tasks.

BRIEF DESCRIPTION OF THE DRAWINGS

The present invention will be more fully understood by reference to the following detailed description of the preferred embodiment of the present invention when read in conjunction with the accompanying drawings, in which reference characters refer to like parts throughout the views and in which.

DESCRIPTION OF THE PREFERRED EMBODIMENT

Figure 1:
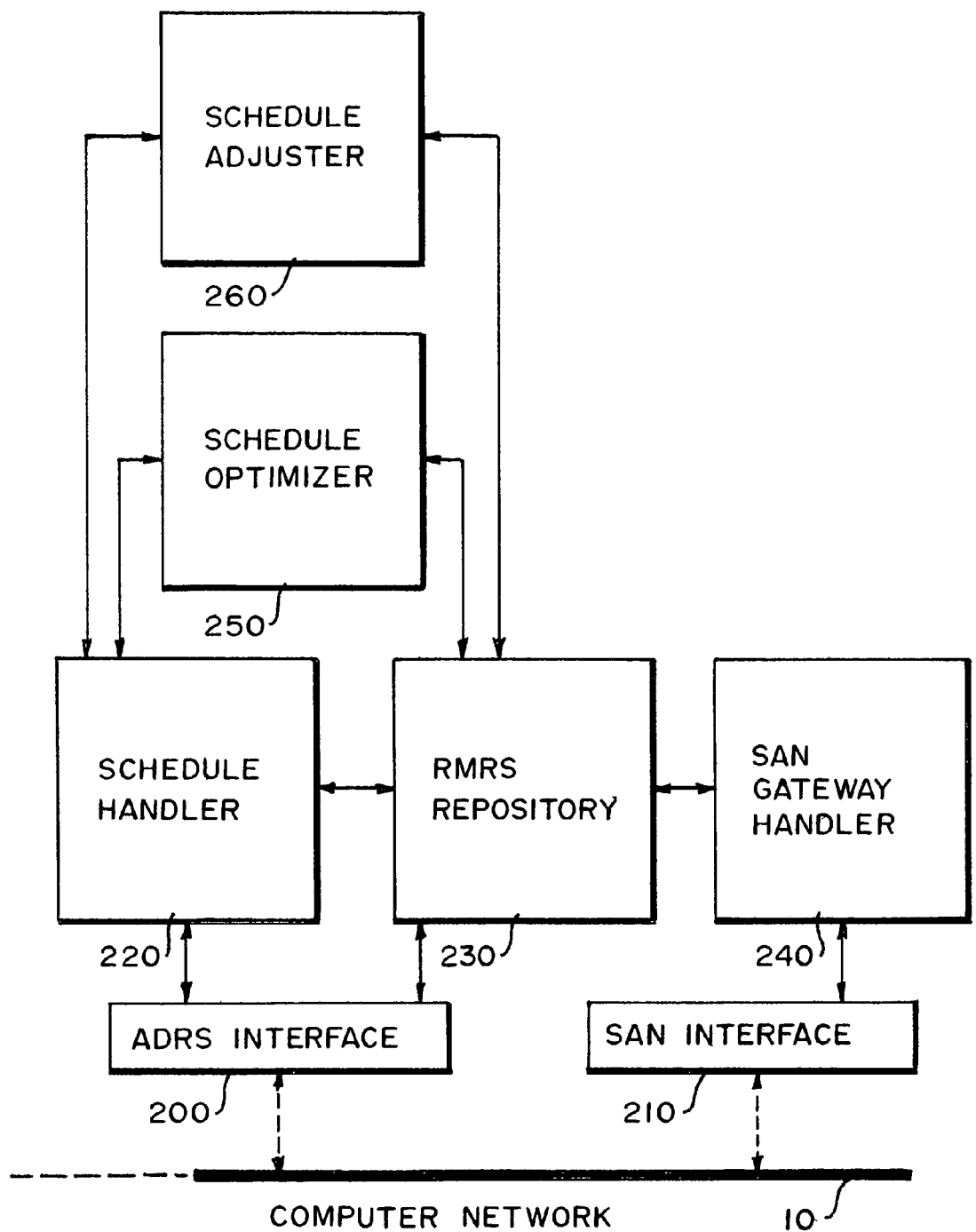
FIG. 1 is a block diagram showing the components of the RMRS system of the present invention.

The present invention, i.e., the Resource Management and Reservation System (RMRS) for managing and reserving storage bandwidth, is a platform independent middleware layer that provides an interface to applications, their database management systems, or some other higher level data management systems like ADRS which does data management on behalf of the applications. The invention is highly relevant in hosted environments where one or more applications may be run on behalf of multiple customers each with a unique service level agreement with the Service Provider.

Through its interface to the aforementioned applications, RMRS allows each application or an application side management system to communicate expected future storage access requirements (e.g., periodic access for backups). The interface also allows applications to request urgent storage access (e.g., recovery actions may be requested without being planned ahead of time).

RMRS creates a tentative plan for allocating available storage bandwidth among multiple applications, taking into account priorities among applications, their normal storage access workload (such as OLTP workload) and after-provisioning for unplanned urgent requests such as recovery requests.

These priorities are assigned taking into account quality of service commitments the Service Provider may have with the customers of the hosted applications. The schedule is computed (1) to ensure appropriate allocation of bandwidth to individual instances of an application, (2) to minimize the contention for storage bandwidth among multiple applications, and (3) to increase the overall bandwidth utilization of the storage subsystem, which is a shared resource. The planned schedule is made known to each application and the scheduled application task can be preempted if it has not been started.

RMRS also interfaces with a storage service manager such as a SAN Gateway, as described in IBM patent application disclosure ARC9-2002-0010, entitled "A Method for Improving Performance in a Computer Storage System by Regulating Resource Requests from Clients," as described above, to monitor and to provide performance feedback in real time. It monitors the effective bandwidth delivered to each application and provides feedback to the storage service manager so the storage service manager can selectively improve the bandwidth delivered to one application by throttling I/O requests from another application.

Such real-time monitoring and feedback helps Service Providers in meeting the QoS requirements committed to individual customers/applications without having to use dedicated or hardwired storage subsystems. RMRS keeps track of application specific histories and uses this information when creating new plans Optionally, RMRS can monitor and control multiple storage subsystems distributed over a wide area network.

RMRS is a web-based entity that is available as a web service to its clients. It can be located over the Internet and interactions with it can be carried out using standard web services protocols in a platform independent manner. ADRS, which is a client of RMRS, interacts with RMRS over the Internet for scheduling I/O intensive storage accesses such as the backup and recovery I/O tasks associated with multiple applications hosted by a Service Provider.

Normally backups are relatively low priority tasks and periodic in nature and hence very well suited for advance resource reservation.

Recovery tasks are high priority tasks and mostly unpredictable in nature and require immediate allocation of storage bandwidth. ADRS assigns a unique priority to each task based on the task type (backup, recovery etc.) and application/customer that issues the task. ADRS allocates overlapping bands of priorities based on task types. The lower band corresponds to backup tasks while the upper band corresponds to recovery task. Within each band, tasks are further prioritized depending on the customer, the application, and the quality of service associated with <customer, application> pair. ADRS interacts with RMRS using a well-defined interface published by RMRS using, the web services description language (WSDL).

Using the published RMRS interfaces, ADRS issues scheduling requests for multiple I/O tasks (such as backup and recovery) associated with the multiple applications it manages. ADRS provides the scheduling hints such as task frequency, priority, expected start-time, expected bandwidth range (based on task duration and data size) and so on. It also describes any constraints on the time window during which an I/O task must be completed. Such a constraint may arise from the service guarantees that the Service Provider may have given to the customer of a particular application. For example, a backup may be taken only between 8 PM to 8 AM or a recovery task must be completed within 30 minutes of the issuing the request.

Typically, ADRS requests RMRS to generate a periodic schedule for backup tasks over an optimal period (say 1 week or 1 month). RMRS creates a schedule for the periodic backup tasks taking into account the specified constraints and the available I/O bandwidth. The I/O bandwidth is provided by a common storage subsystem such as a Storage Area Network (SAN) and is shared resource with finite capacity. If the I/O tasks are not scheduled in a systematic manner, there may be periods of high I/O activity followed by low or no I/O activity. During, the high activity periods, the contention for bandwidth can lead to starvation among tasks and during low activity periods, the bandwidth remains underutilized. The net effect is the inefficient use of available I/O resources and/or high costs. RMRS provides its services to avoid such conditions. In particular, it creates a plan for known I/O tasks such that the contention for bandwidth among the tasks is minimized at all times and utilization of the available bandwidth is maximized over time. This plan is updated dynamically as new tasks are identified and priorities are changed. When contentions become unavoidable, RMRS creates a priority based scheduling of the tasks such that high priority tasks meet their objectives at the expense of low priority tasks. Hot backups or recovery tasks need to be scheduled immediately and hence they are typically assigned the highest priority. Furthermore, these types of tasks cannot be anticipated and scheduled in advance. To accommodate the high priority recovery tasks, RMRS adjusts the existing schedule and the bandwidth allocation either by reducing current bandwidth allocation to low priority routine backup tasks, if they are already running or by re-scheduling those that are yet to start. Whenever a new schedule is created or updated, RMRS informs the ADRS about the schedule or the change in the existing schedule. At the scheduled time, unless otherwise advised by RMRS, ADRS instructs the appropriate instance of an application to invoke the corresponding task.

The RMRS system of the present invention comprises the components illustrated in FIG. 1. Referring to FIG. 1, all interactions with ADRS and the hosted applications take place via the ADRS interface (200). The ADRS interface (200) uses the computer network (10) to communicate with ADRS and/or the hosted applications. The Schedule Handler (220) interacts with the ADRS subsystem and/or the hosted applications using the ADRS Interface (200). The Schedule Handler (220) also interacts with the RMRS Repository (230), the Schedule Optimizer (250), and the Schedule Adjuster (260). Both the Schedule Optimizer (250) and the Schedule Adjuster (260) communicate with RMRS Repository (230), in addition to the Schedule Handler (220). The SAN Gateway Handler component (240) interacts with the RMRS Repository (230) and also interacts with the SAN Gateway via the SAN Interface (210).

Figure 2:
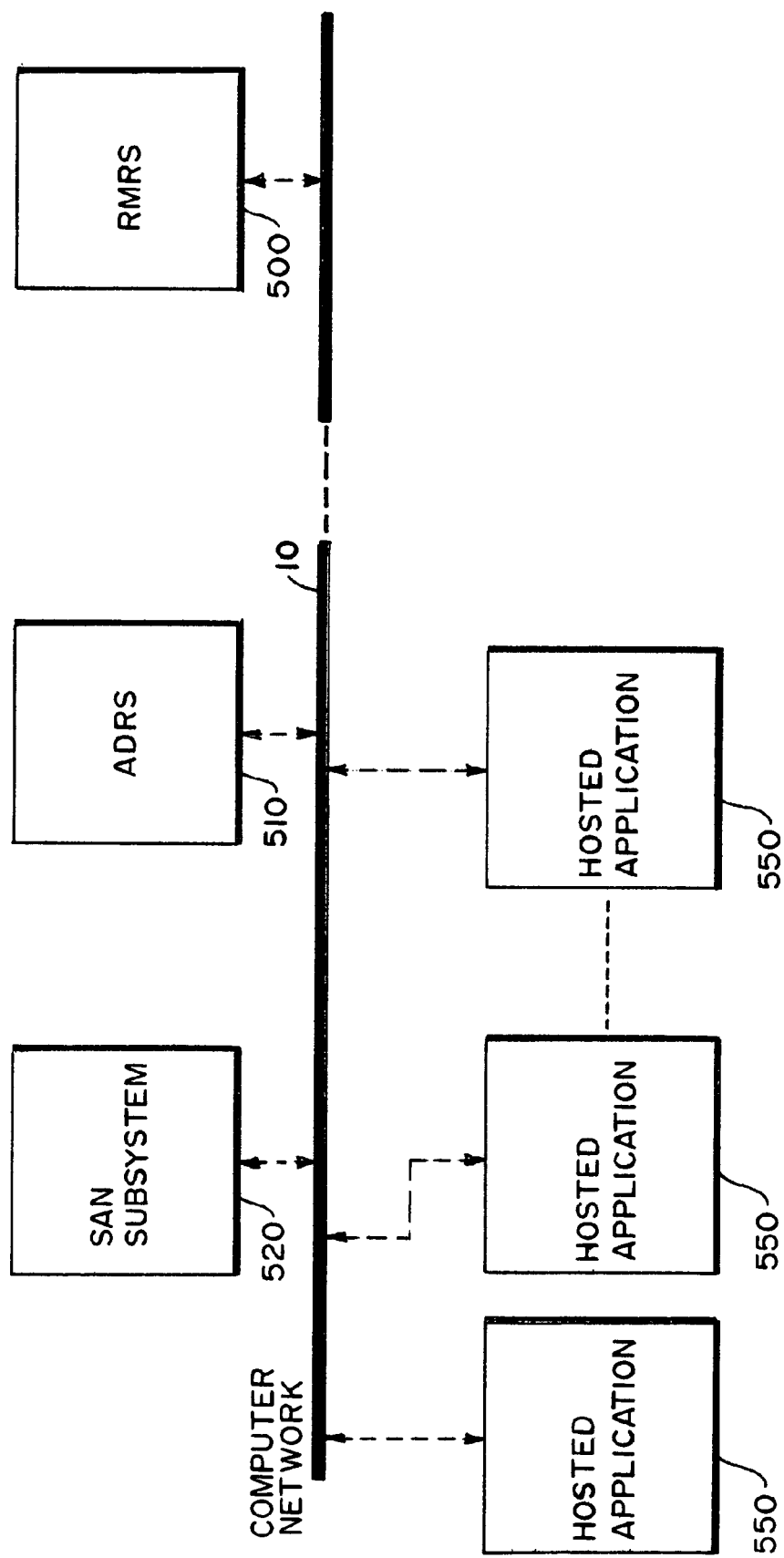
FIG. 2 illustrates the configuration of the RMRS as used in combination with ADRS, a SAN subsystem and hosted applications over a computer network.

FIG. 2 illustrates the overall configuration of RMRS (500) in the context of ADRS (510), the SAN Subsystem (520), and the hosted applications (550) over a computer network (10).

As mentioned earlier, RMRS is deployed as a web service. Its services are accessed over the network using web services invocation protocols. Using the interfaces provided by RMRS, ADRS invokes one or more RMRS APIs to convey to RMRS the information related to the dynamic changes in I/O requirements taking place in response to the changes in the state of the hosted applications.

For example, the RMRS interfaces allow ADRS: (i) to register itself as a client of RMRS, (ii) to define and register a new task and its attributes, (iii) to update the attributes of an already registered task, (iv) to un-register a previously registered task, (v) to generate multiple instances of defined task, (vi) to request a schedule for a registered task (schedule for a single instance or multiple instances for the task), (vii) to verify the current validity of a schedule, and so on.

When an RMRS interface is invoked, the information is passed over the network, through the ADRS Interface component (200 in FIG. 1) and then to the RMRS Repository (230 in FIG. 1).

Using these interfaces, ADRS can define and register different types of tasks; e.g., Sequential Backup, Parallel Backup, Incremental Backup, Sequential Recovery, Parallel Recovery and so on. Other attributes of a task include task priority, task frequency, constraints on when a task may be performed, expected time to completion, range for the data size being accessed or stored, a list of resources needed to perform the task, etc.

Defining a task with RMRS makes RMRS register the task information in the RMRS Repository and the object information (such as the file set or the database associated with the particular instance of the application) on which task is performed. This information is stored in the RMRS Repository (230) shown in FIG. 1. A task defined with RMRS may be invoked many times. Each instance of a task inherits the attributes of the originally defined task. However, the attributes of the defined tasks could be overridden for a particular invocation of the task.

When a task is defined with RMRS, it generates a unique identification (id) for that task. RMRS evaluates and returns if additional resource capacity is required to service the new task in the presence of other tasks already defined and scheduled. This evaluation is performed irrespective of the priority of this new task. Even if the task cannot be scheduled because of resource shortage, RMRS registers the task successfully, but indicates to ADRS that additional resource capacity is required for servicing this new task, without compromising the previously defined tasks. This analysis is provided to assist ADRS and Service Provider in capacity planning whenever a new application is launched or when a new customer is signed in.

In such cases, ADRS has one of the three choices: (i) provisioning of additional resources before scheduling the task, (ii) continuing with available resources, or (iii) sending a request to RMRS to un-register the task definition. Policies may be set that would allow ADRS to make a decision or the Service Provider may directly intervene and make a decision.

Defining a task and successfully registering the task with RMRS does not imply reservation of any resources. The resources are allocated and reserved for a task only when an instance of the task is scheduled. Separate interface is provided to schedule one or more instances of a registered task. This separation of task definition/registration from scheduling of individual instances allows RMRS to incorporate dynamic changes associated with individual invocation of a task while keeping track of long-term requirements and goals. The dynamic changes are brought about by unpredictable, but lasting over a short duration events, where as stable trends are set by long term and predictable repetitive events. RMRS provides interfaces to gather information on both short term and long events and processes those accordingly.

When an instance of a task is being scheduled for execution during a specified time window and with a specific instance priority, depending on task priority, RMRS may or may not consider all the constraints specified when the task is defined. For example, when the priority is set as "must_complete," RMRS ignores all the constraints and schedules the task at the specified time as a highest priority task. On the other hand, if priority is not set to be "must_complete," then RMRS schedules the task instance by considering the task constraints and the task instance is scheduled optimally, close to the specified start time.

In the above explication, we have described the ADRS-RMRS interactions in general terms. The following describes a particular embodiment of this interaction. Obviously, there are several variations to this interaction flow:

1. ADRS registers itself as a client of RMRS using the registerClient( ) API.
2. ADRS keeps track of client application information with itself for backup/recovery. Each application is associated with set of recovery objects like Databases, Tablespaces, Files etc. which need to be backed up and restored whenever required. During the application registration phase, ADRS on behalf of applications, registers the Data Size, Backup frequency, Constraint Windows etc. for each object and type of the task being performed on the object (like backup, recovery etc.) using setTaskDefinition( ) API. One task definition is registered per <ObjectID, TaskType> tuple. e.g. <DB1, Sequential Backup>, <DB2, Incremental Backup> and so on.
3. If setTaskDefinition( ) API returns failure then it is an unexpected system error. If the API returns success but requests for more resources, then ADRS selects from one of the three available choices: provision additional resources, continue with existing resources, or call unSetTaskDefinition( ) API and not serve the application. The choice is made based on the current policy applicable to that application.
4. When a task is successfully registered, RMRS returns a TaskDefinitionID which ADRS stores it during the lifetime of that task and uses it to schedule individual instances of that task.
5. ADRS invokes generateTaskSchedule( ) API for the <ObjectID, Backup> task to generate the backup schedule for a meaningful period of time; for example, one week or one month. RMRS returns a plan for the set of task instances detailing when each backup task is to be scheduled.
6. ADRS uses the plan created by RMRS to invoke the backup tasks at the scheduled time intervals. However, just before invoking a backup task, ADRS does a final check with RMRS using the is TaskRunnable( ) API to check if the task can be invoked at this fine. If RMRS has rescheduled the task (i.e., postponed it to some other time in the future), then ADRS receives a new invocation time for that task and updates its internal the event table accordingly.

7. When a backup task is in progress, statistics on several performance metrics are monitored and gathered. For example, ADRS would gather the statistics on time taken to complete the backup, the data size, database configuration, and so on. It invokes the updateTaskDefinition( ) API at the end of a backup task if any of the task definition parameters are found to have changed. If the change in task definition affects the current plan for the task schedule then RMRS first invalidates the existing backup plan for the task. As a result, ADRS invalidates its internal plan and invokes generateTaskSchedule( ) API to rescheduled the task with updated task definition parameters.

8. When a backup task completes successfully, ADRS invokes the taskComplete( ) API to indicate to RMRS that task has completed successfully and informs RMRS the actual time taken to complete the backup task. RMRS has an internal estimate for the expected completion time for the task It compares the expected completion against the actual completion time. Over the time it helps RMRS learning the relation between expected time and actual time for task completion to better optimize the schedules.

9. When a task is completed successfully and ahead of expected completion time, then RMRS can unblock resources reserved for that task and make those available for allocation to other tasks. The blocking and unblocking within RMRS is a logic concept internal to RMRS and there is no blocking of the actual resource. If a task ends prematurely, i.e., if the backup fails, then ADRS indicates this to RMRS using the taskComplete( ) API and also indicates to RMRS whether the allocated resources should be released or continued to be allocated to the task. If ADRS intends to rescheduled the task immediately, the resources are not to be released.

10. When all the tasks in plan have been scheduled or otherwise taken care of, ADRS invokes generateTaskSchedule( ) API again to generate another plan for next plan period.

11. For tasks such as recovery, rescheduling of failed backup, hot backups (i.e., those that are invoked by users and that are outside the routine backup cycles), ADRS uses the scheduleTask( ) API to schedule these type of tasks.

12. In case of a change in the attributes associated with a task definition (e.g., TaskPriority or TimeConstraintWindows), ADRS invokes updateTaskDefinition( ) API. This API updates the task definition values stored in the RMRS Repository. Any such change in the critical attribute values can invalidate the existing task schedule (for tasks instances that are not yet executed) and indicate that to ADRS. A schedule is computed if requested by ADRS.

In addition to ADRS, RMRS interfaces with the SAN Gateway via the SAN Interface component (210 in FIG. 1). Typically, SAN Gateway manages and controls I/O streams associated with I/O requests. Whenever a backup or recovery task is initiated, two logical I/O stream connections are managed by the SAN Gateway. One of the I/O streams is between the host machine (where the application associated with the backup/recovery task is running) and the logical volume where application database/file object resides aid the other is between the host machine and the logical volume where the backed up data resides. These two streams are together referred to as the Application Stream Group (ASG). For each backup or recovery task scheduled by RMRS, it specifies a Service Level Specification (SLS) for the corresponding Application Stream Group (ASG) managed by the SAN Gateway. An SLS specifies the I/O operation, the desired I/O response time, and the priority for the I/O operation. These specifications change depending on the type and the instance of the task. The SAN Gateway uses the priorities mentioned in the specifications to resolve conflicts among contending ASGs. For example, when the system is configured, the ASG corresponding to a regular OLTP workload may be assigned a priority based on customer/application priority that originates the workload. This default priority is dynamically raised or lowered by RMRS, when other tasks are started on the ASG.

When a backup task is scheduled, the default application priority is lowered and the bandwidth allocated to the backup task is raised to achieve the desired effects.

On the other hand, when a recovery task is scheduled, there are no OLTP operations and hence by raising the default application priority and bandwidth allocated to the recovery task, RMRS ensures that the recovery task is scheduled ahead of the other tasks and adequate resources are made available to that task.

Figure 3:
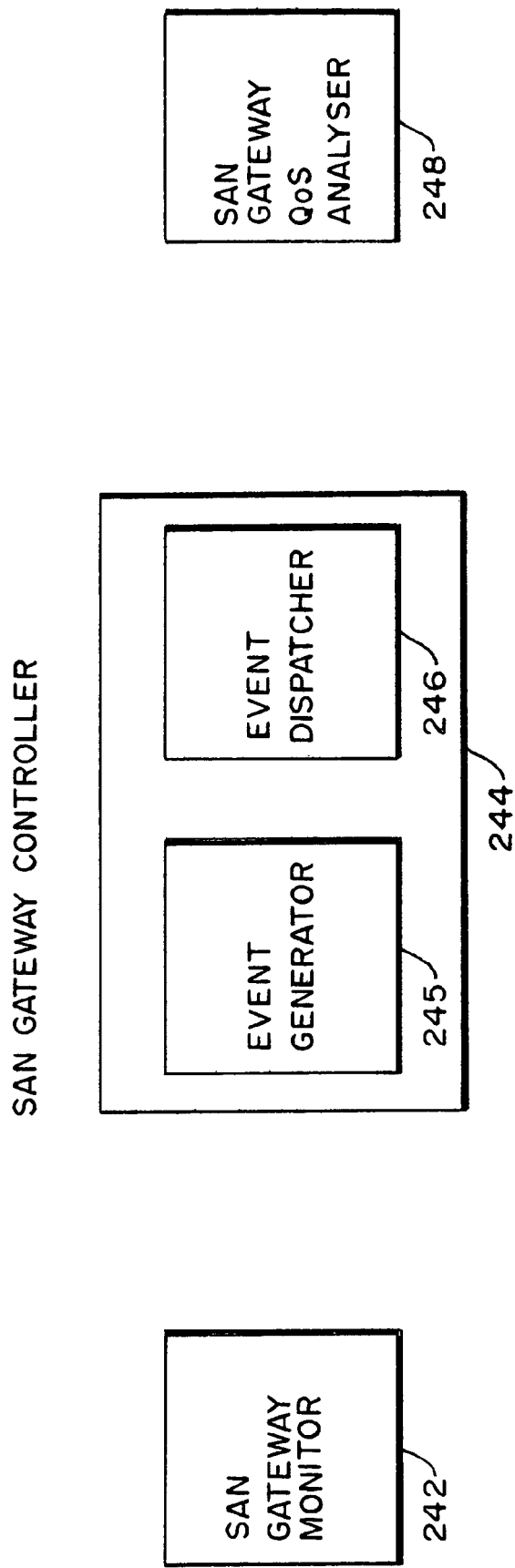
FIG. 3 depicts subcomponents of SAN gateway handler.

The SAN Gateway Handler component (240 in FIG. 1) interacts with the SAN Gateway for monitoring and controlling the priorities and bandwidth resources allocated to the I/O tasks scheduled by RMRS. The SAN Gateway Handler consists of three subcomponents: SAN Gateway Monitor (242), SAN Gateway Controller (244), and SAN Gateway QoS Analyzer (248). These are illustrated in FIG. 3.

SAN Gateway Monitor (242) periodically monitors the ASGs defined at the SAN gateway. The monitoring is performed to ensure that the specified requirements are met. The monitored information (including both expected and actual performance values) is stored in the ResourceUsageMonitor table in the repository.

SAN Gateway Controller (244) consists of two sub components: Event Generator (245) and Event Dispatcher (246). The Event Generator (245) scans the TASKSCHEDULE and APPLICATIONRESOURCEUSAGE tables stored in the RMRS Repository. The TASKSCHEDULE table has the information on the currently planned schedules and the APPLICATIONRESOURCEUSAGE table stores the formation about the default OLTP workload on an ASG. The SAN Gateway Controller (244) generates the bandwidth allocation events whenever there is a change in the allocated bandwidth capacity and/or the priority for any of the ASGs (for example, when a new task starts or ends).

Event Dispatcher component (246) processes the events generated by Event Generator by invoking the controlASGResourceAllocation( ) API to apply die new SLS for the ASGs. This is accomplished by sending a request to the SAN Gateway with revised bandwidth allocation requirements and priorities for ASGs.

SAN Gateway QoS Analyzer (248) analyzes the RESOURCEUSAGEMONITOR table along with TASKSCHEDULE table and provides hints to Schedule Handler (220 in FIG. 1) for possible contentions with certain set of application tasks scheduled in the future. This may prompt the Scheduler to update schedules accordingly.

Recovery tasks cannot be planned in advance. Thus, whenever an unexpected recovery task is scheduled, this may result in dynamic changes to the planned schedules of other tasks. This may also result in changes in the resources allocated to an already scheduled task. In most cases, a recovery task is scheduled almost immediately or at a time specified by ADRS. In one embodiment, ADRS may specify the time when the task has to be finished rather than the time at which it should begin. In that case, RMRS may have some flexibility in scheduling the recovery job. Tasks that are currently in executing are allowed to run. However, the allocated bandwidth may be reduced. In such a case, the SAN gateway handles the priority based throttling of the currently running tasks. Low priority tasks are typically throttled more to meet the requirements of the high priority tasks. All the lower priority tasks, which are not yet started but are scheduled to start over the duration of the new recovery task, are considered for rescheduling.

The SAN Gateway Handler also plays an important role in ensuring that tasks are completed on schedule. In general, ADRS provides an estimate of the expected run time of the task based on the statistical analysis of similar tasks run in the past. Using this estimate, RMRS calculates the normal bandwidth requirement for completing the task within that estimated time interval. In some cases, ADRS may also provide a maximum expected run time (i.e., a hard limit) for executing the task. In other words, task cannot run longer than that period. Such limits may be driven by the service level agreements with the customer of the corresponding application. In such cases, RMRS monitors the progress of the task to ensure that the task completes at the expected time. This is accomplished in two stages. Whenever a task begins to execute, the Event Generator (245) generates an end of the task event as per scheduled end time for the task. Event Dispatcher (246) checks to see if the corresponding task has completed by checking to see if a notification has been received from ADRS (through the taskComplete( ) API). If not, then it looks in the ResourceUsageMonitor table to get an estimate on how far the corresponding ASG is tagging in meeting the specified SLS. From this it estimates how much more time the task may need to complete. It then sends a request to RMRS scheduler to immediately extend the current task for that time period or till the hard limit of task finish time, which ever is earlier. This extension of the task is similar to a request for scheduling an unplanned task. The priority of the task that is being delayed typically remains unaltered. However, if the hard limit seems unlikely to be met, then Event Dispatcher may request for allocation of additional bandwidth for that task.

In one embodiment, RMRS-SAN interface has the following components. Obviously other variations are possible.
1. registerWithResourceManager( ) for Registration: RMRS registers itself as a client with SAN Gateway.
2. configureApplicationsStreamsConnection( ): RMRS configures the I/O streams (ASGs) with SAN Gateway for different applications.
3. controlASGResourceAllocation( ) for dynamic manipulation of the ASGs: Through this interface, RMRS can dynamically change the resource Allocation and Priorities of a specified ASG.
4. monitorASG( ) for monitoring an ASG at regular interval to cheek if that ASG meets the specified requirement.

When a set of task instances need to be scheduled and bandwidth resource needs to be allocated and reserved, the Schedule Optimizer component (250 in FIG. 1) is invoked. The Scheduler Adjuster component (260 in FIG. 1) is invoked mainly to do the background optimization in order to reduce the excess bandwidth utilization over maximum SAN bandwidth. It could also be invoked in response to events like unscheduled task when some additional resource becomes available or when task priorities are changed through update task definition request from ADRS, etc.

The Schedule Optimizer (also referred here after as scheduler) receives input as instances of task-definitions, registered with RMRS, for I/O tasks and outputs a plan for these I/O requests. In essence, every request asks for transferring an expected, fixed amount of data across the storage network. The requests, tagged with their respective priority index, specify a desired bandwidth and thus the desired time in which the task should be completed (since expected bytes to be transferred are specified). Each task/request desires to get a starting time and allocated bandwidth from the scheduler, such that the start and end times planned for it are within the allowed-time-windows (constraint windows) for the request. The scheduler is free to shift the request around within a constraint window and allocate a different B/W than originally sought so long as the plan for the request still meets its byte transfer agenda. Deviation from an ideal placement and B/W allocation sought by the request can be priced higher than the preferred placement itself.

The above-mentioned objectives and constraints are framed into an optimization problem, which tries to achieve the following objectives.
a.) Priority based allocation of bandwidth to individual task instances at their expected start time.
b.) Spread out, over time, the planned use of the storage network so that planned usage peaks are reduced. Otherwise, such peaks can become hot spots of weakness in case available network capacity fluctuates due to unplanned events such as recovery, or unexpectedly large OLTP load.

The optimization problem tries to obtain the above-mentioned two-fold objective while observing the following constraints:
a.) A request, if honored, has to be honored within its defied constraint windows
b.) B/W and time duration allocated to ail honored request must be adequate to cover all the expected, transfer bytes of the request.
c.) The total allocated bandwidth at any point of time should not be more than a maximum bandwidth or the storage network, i.e. $B_{MAX}$.

The two-fold objective above can be reduced to a penalty minimization objective function where the optimizer tries to find a solution to the minimization problem while observing the aforementioned constraints.

Figure 5:
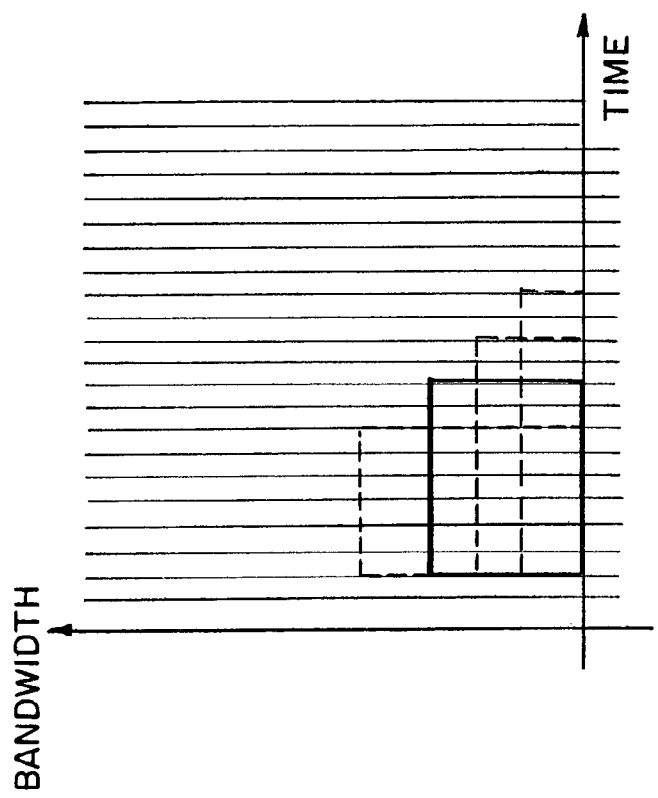
FIG. 5 is a graph showing cost of function plotting bandwidth $B_{max}$ as a function of a time and shows discrete shapes as dotted rectangles and discrete starting positions as vertical lines.
Figure 4:
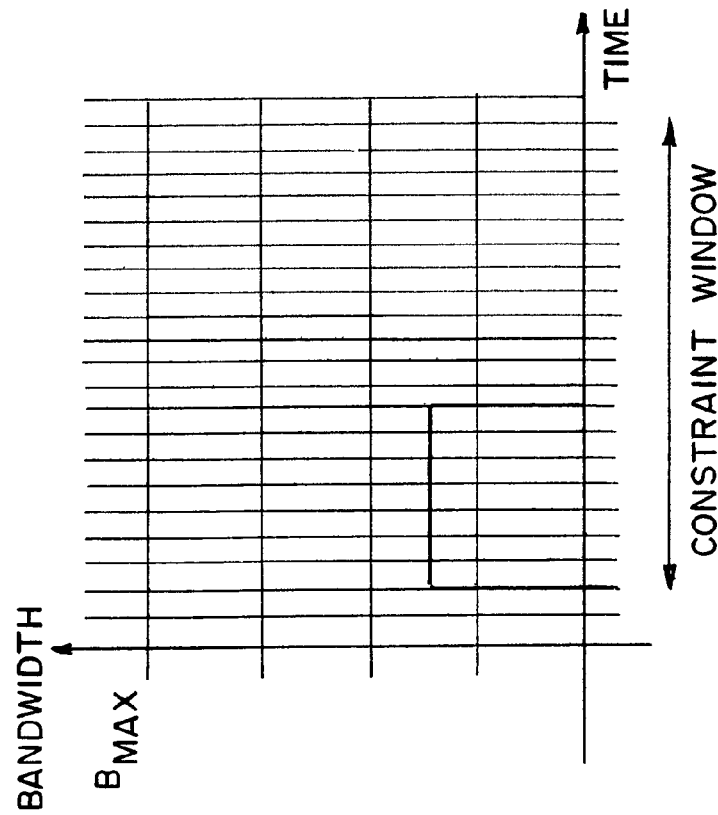
FIG. 4 is a graph plotting bandwidth $B_{max}$ as a function of a time (constraint window) and shows discrete positions as vertical lines and various bands demarcated by horizontal lines into which the bandwidth has been divided.

The optimization problem can be conveniently described as a tiling problem on a two-dimensional plane as shown in the FIG. 4. In that figure, bandwidth is plotted along the y-axis and time along the x-axis. A request seeks the allocation of a preferred bandwidth at a given starting time in the figure, which corresponds to seeking to occupy a rectangular tile (of desired B/W height) at a given time in the figure. The cost function of the optimization problem accounts for the two-fold objective above by associating proportional penalties (or benefits) to the various possible shapes (shown by dotted rectangles in FIG. 5) and start times of all the requests (shown by dotted vertical lines in FIG. 5). The global plan that the scheduler comes back with for all requests can thus entertain shifting/reshaping of requests, rejection of low-priority requests in order to handle contention and ensure that high-priority requests do get allocated, and spreading out of requests so that in general, spare network capacity is left over to cover unplanned for contingencies.

Computing an optimal plan that allows for reshaped requests makes the optimization problem, being considered here, a non-linear one. This is because arbitrary reshaping allows a continuous range of time durations for a request, with the allocated bandwidth being an inverse of the duration. The constraint of ensuring that B/W use does not exceed $B_{MAX}$ at any time this becomes a non-linear formulation in terms of the sum of inverse time durations. Our invention seeks to avoid the hardness of such non-linear optimization by linearizing the problem using a quantization technique that we describe next.

The time line is discretized (or quantized) into a finite number of points, as shown by the dotted vertical lines in FIG. 4. All the requests and constraint windows are aligned along these discrete points, this in turn discretizes the duration of tasks as well. This approach greatly simplifies the computation of parameters like bandwidth usage, area occupied in various bands, overlap duration of tasks etc. Similarly the shape of a task-tile (i.e. height of the rectangle) is also reduced to a finite number by discretizing the height (i.e. bandwidth) to a finite number of possibilities, as shown by the dotted rectangles in FIG. 5.

This discretization of variables reduces the original problem into a problem wherein an operator chooses a solution out of, a very large but finite number of solutions such that the objective is minimized (maximized) without violating any of the constraints. This can be modeled and solved as an ILP (Integer Linear Program) or as a fractional LP (Linear Program) with an approximate integer solution. Suitable methods for developing such solutions is found in one or more of the following references: Bar-Noy, A., Bar-Yehuda, R., Freund, A., Naor, J., and Schieber, B., *A Unified Approach to Approximating Resource Allocation and Scheduling*, J. ACM 48, 5 (2001), 1069-1090; Stefano Leonardi, Alberto Marchetti-Spaccamela, Andrea Vitaletti, *Approximation Algorithms for Bandwidth and Storage Allocation Problems under Real Time Constraints*, Foundations of Software Technology and Theoretical Computer Science (FSTTCS2000), pp. 409-420; and/or Hadley, G., *Linear Programming*, Addison-Wesley, 1962; the contents of which are hereby incorporated by reference herein.

The solution so obtained can be assumed as a solution to a relatively coarse version of the original problem and any finer level precision of variables can be obtained by a customized post-processor.

The objective of avoiding the unnecessary stacking of tasks over one another is met by dividing the complete bandwidth axis (ordinate) into various bands as shown by the dotted horizontal lines found in FIG. 4. Bands closer to the abscissa are priced lower than those closer to $B_{MAX}$. Area occupied by the accepted requests in various bands is computed and penalty/cost of occupying area in various bands is added to the total cost function. Thus minimization of the objective function automatically discourages the peaks of planned usage of storage bandwidth.

Solving the optimization problem gives optional/sub-optimal time and bandwidth plans for the requests. The time-plan generated by RMRS and corresponding execution of the same may suffer inconsistencies if the clocks of ADR, RMRS and SAN are not logically synchronized.

Techniques addressing the issues in reconciling different timelines can be found in the following references: Leslie Lamport, *Time, Clocks and the Ordering of Events in a Distributed System*, "Communications of the ACM," vol. 21, July 1978, pp 558-565; David Mills, *Improved Algorithms for Synchronizing Computer Network Clocks*, "IEEE/ACM Transactions on Networking," vol. 3, no. 3, June 1995, pp 245-254

The Scheduler Adjuster is a lightweight component as compared to the Schedule Optimizer. It is triggered whenever there is excess usage of storage bandwidth above the maximum available limit. Whenever a scheduled task instance causes the bandwidth usage to exceed the available or allocated bandwidth, this fact is memorized and the Adjuster is triggered to perform priority based adjustment in the schedules over or around the period of excess usage. The main goal of Schedule Adjuster is to lower down the excess usage as much possible using heuristic rules.

For example, one rule could be to move the low priority contending task instances in their constraint bounds to minimize the excess resource usage. Another rule may be to stretch the duration of a low priority task instances by lets say 25% to lower its bandwidth requirements. Yet another rule may be to preempt a previously scheduled low priority task.

While the present invention has been described with respect to preferred embodiments, numerous modifications, changes and improvements will occur to those skilled in the art without departing form the spirit and scope of the invention. The invention relating to RMRS is exemplified herein as being used in combination with ADRS and SAN Gateway. These systems are presented as illustrative of how the RMRS system operates. It is not intended that the scope of the invention be limited to those two systems working in conjunction with RMRS. Any component which interacts to monitor and control the priorities and bandwidth resources allocated to the I/O tasks scheduled by the RMRS can be used.

What we claims and desire to protect by Letters Patent is:

1. A system comprising a Resource Management and Reservation System (RMRS) for managing and reserving storage bandwidth by controlling storage access requests which provides an interface to applications having:
   a computer network to which it is connected;
   an application data recovery service ADRS interface element and a storage area network (SAN) interface element;
   a scheduler/optimizer handler element and a RMRS repository element having contents, each connected to said ADRS interface and to each other, said scheduler/optimizer handler element responsive to both said ADRS interface and to said contents of said RMRS repository element;
   a SAN Gateway handler which is connected to said SAN interface and to said scheduler/optimizer handler element and said RMRS repository element, said SAN Gateway handler responsive to scheduling information provided by said scheduler/optimizer handler element; and
   a schedule adjuster and a schedule optimizer each connected to said RMRS repository element and to said scheduler/optimizer handler element; said schedule adjuster and said schedule optimizer providing adjusted and optimized schedule information to said schedule/optimizer handler element.

2. The Resource Management and Reservation System defined in claim 1 wherein said SAN interface comprises subcomponents comprising a SAN Gateway Monitor, a SAN Gateway Controller and a SAN QoS Analyzer.

3. The Resource Management and Reservation System defined in claim 2 wherein said ADRS is a client of said RMRS, interacts with RMRS over the Internet for scheduling I/O intensive backup and recovery I/O tasks associated with multiple applications hosted by a Service Provider.

4. The Resource Management and Reservation System defined in claim 3 wherein when said backup or recovery task is scheduled, said RMRS interact with said SAN Gateway and monitors in real soft time the effective bandwidth realized by said task.

5. The Resource Management and Reservation System defined in claim 3 wherein said TASKSCHEDULE table has information on currently planned schedules and said APPLICATIONRESOURCEUSAGE table stores the information about an OLTP workload.

6. The method using the Resource Management and Reservation System defined in claim 2 comprising:
deploying said RMRS as a web service wherein its services are accessed over a network using web services invocation protocols;
using interfaces provided by RMRS, said ADRS invokes at least one RMRS APIs to convey to RMRS information related to dynamic changes in I/O requirements taking place in response to changes in the state of hosted applications.

7. The method using the Resource Management and Reservation System defined in claim 6 wherein said RMRS interfaces allow ADRS: (i) to register itself as a client of RMRS, (ii) to define and register a new task and its attributes, (iii) to update the attributes of an already registered task, (iv) to un-register a previously registered task, (v) to generate multiple instances of defined task, (vi) to request a registered task schedule for a single instance or multiple instances for said task), (vii) to verify the current validity of a schedule.

8. The method using the Resource Management and Reservation System defined in claim 7 wherein using said interfaces, said ADRS defines and registers said tasks, said tasks comprising Sequential Backup, Parallel Backup, Incremental Backup, Sequential Recovery, Parallel Recovery.

9. The method using the Resource Management and Reservation System defined in claim 8 wherein attributes of said task include task priority, task frequency, constraints on when a task may be performed, expected time to completion, maximum time limit for completion, range for the data size being accessed or stored, and a list of resources needed to perform the task.

10. The method using the Resource Management and Reservation System defined in claim 9 wherein defining said task with RMRS makes RMRS register said task information in said RMRS Repository and the object information on which said task is performed.

11. The method using the Resource Management and Reservation System defined in claim 10 wherein said object information is collected from a file set or the database associated with the particular instance of the application on which the task is performed, and this information is stored in said RMRS repository.

12. The method using the Resource Management and Reservation System defined in claim 11 wherein said task defined with RMRS is invoked in a plurality of instances, and each instance of said task inherits the attributes of the originally defined task, with the ability of the defined task to be overridden for a particular invocation of said task.

13. The method using the Resource Management and Reservation System defined in claim 12 wherein upon defining a task with RMRS, a unique ID is generated for that task.

14. The method using the Resource Management and Reservation System defined in claim 13 wherein upon defining a task, RMRS evaluates and returns if additional resource capacity is required to service the new task in the presence of other tasks already defined and scheduled.

15. The method using the Resource Management and Reservation System defined in claim 14 wherein said evaluation is performed irrespective of the priority of said new task.

16. The method using the Resource Management and Reservation System defined in claim 15 wherein the event the task cannot be scheduled because of resource shortage, RMRS registers the task successfully, and indicates to said ADRS that additional resource capacity is required for servicing the new task, without compromising the previously defined tasks, said analysis being provided to assist ADRS and Service Provider in capacity planning whenever a new application is launched or when a new customer is signed in.

17. The method using the Resource Management and Reservation System defined in claim 16 wherein in the event said new application is launched or a new customer is signed in, ADRS has one of the three choices: (i) provisioning of additional resources before scheduling the task, (ii) continuing with available resources, or (iii) sending a request to RMRS to un-register the task definition, Policies may be set that would allow ADRS to make a decision or the Service Provider optionally directly intervene and make a decision.

18. The method using the Resource Management and Reservation System defined in claim 17 wherein said registering the task with RMRS does not imply reservation of any resources since said resources are allocated and reserved for a task only when an instance of the task is scheduled.

19. The method using the Resource Management and Reservation System defined in claim 18 wherein a separate interface is provided to schedule one or more instances of a registered task and said separation of task definition/registration from scheduling of individual instances allows RMRS to incorporate dynamic changes associated with individual invocation of a task while keeping track of long-term requirements and goals.

20. The method using the Resource Management and Reservation System defined in claim 19 wherein said dynamic changes are brought about by unpredictable events, which last over a short term duration, whereas stable trends are set by long term and predictable repetitive events and RMRS provides interfaces to gather information on both short term and long term events and processes them accordingly.

21. The method using the Resource Management and Reservation System defined in claim 20 wherein in the event a task is being scheduled for execution during a specified time window and with a specific instance priority, depending on task priority, RMRS optionally considers all the constraints specified when the task is defined.

22. The method using the Resource Management and Reservation System defined in claim 21 wherein when said priority is set as "must_complete," RMRS ignores all constraints and schedules the task at a specified time as a highest priority task and if said priority is not set to be "must_complete," then RMRS schedules the task instance by considering the task constraints and the task instance is scheduled optimally, close to a specified start time.

23. The Resource Management and Reservation System defined in claim 2 wherein said RMRS interfaces with said SAN Gateway via said SAN Interface component.

24. The Resource Management and Reservation System defined in claim 23 wherein said SAN Gateway manages and controls I/O streams associated with I/O requests.

25. The Resource Management and Reservation System defined in claim 24 wherein at a point in time when a backup or recovery task is initiated, two logical I/O stream connections are managed by said SAN Gateway.

26. The Resource Management and Reservation System defined in claim 25 wherein said two streams comprise an Application Stream Group (ASG).

27. The Resource Management and Reservation System defined in claim 26 wherein said Application Stream Group comprises an I/O stream:
between the host machine where the application associated with the backup/recovery running and logical volume where an application database object resides; and between the host machine and logical volume where the backed-up data resides.

28. The Resource Management and Reservation System defined in claim 27 wherein for each backup/recovery task scheduled by RMRS, a Service Level specification is specified for the corresponding Application Stream Group (ASG) managed by said SAN Gateway.

29. The Resource Management and Reservation System defined in claim 28 wherein said Service Level specification specifies the number of I/O operations per second (bandwidth in terms of Megabytes/sec); the use of the desired response time for each I/O; and the priority for the I/O operations, and SAN Gateway guarantees specified I/O response time as long as I/O operations per second are equal or below the specified value.

30. The Resource Management and Reservation System defined in claim 29 wherein when said system is configured, each ASG is assigned with the default bandwidth required for the regular OLTP workload and is assigned with a default priority based upon a customer/application priority that originates the workload.

31. The Resource Management and Reservation System defined in claim 30 wherein when said priority is raised or lowered dynamically by said RMRS when additional tasks are initiated on the ASG.

32. The Resource Management and Reservation System defined in claim 31 wherein when a backup task is scheduled on an ASG, a default ASG priority is lowered, and the bandwidth allocated to the ASG is raised as required by backup task along with OLTP workload.

33. The Resource Management and Reservation System defined in claim 32 wherein when a recovery task is scheduled on an ASG, a default ASG priority is raised and the bandwidth allocated to the ASG is raised as required by said recovery task.

34. The Resource Management and Reservation System defined in claim 33 wherein said SAN Gateway Controller comprises two subcomponents comprising an Event Generator and an Event Dispatcher.

35. The Resource Management and Reservation System defined in claim 2 wherein said SAN Gateway monitor periodically monitor information from an ASG defined at said SAN Gateway.

36. The Resource Management and Reservation System defined in claim 35 wherein said monitored information is stored in a ResourceUsageMonitor table in a repository.

37. The Resource Management and Reservation System defined in claim 36 wherein said Event generator scans TASKSCHEDULE and APPLICATIONRESOURCEUSAGE tables stored in an RMRS Repository.

38. The Resource Management and Reservation System defined in claim 37 wherein said SAN Gateway Controller Event Generator generates bandwidth allocation events whenever there is a change in the allocated bandwidth capacity and/or the priority for any of said ASGs when a new task starts or ends on said ASG.

39. The method using the Resource Management and Reservation System defined in claim 1 comprising: the ADRS interface uses a computer network to communicate with ADRS and/or hosted applications;
   said schedule handler interacts with said RMRS repository, said schedule optimizer and said schedule adjuster;
   said schedule optimizer and said schedule adjuster communicate with said RMRS repository and with said schedule handler;
   said RMRS repository also interacts with said SAN Gateway Handler component which in turn interacts with said SAN Gateway via said SAN interface.

40. A method comprising using a Resource Management and Reservation System (RMRS) for managing and reserving storage bandwidth by controlling storage access requests which provides an interface to applications, said system having:
   a computer network to which it is connected
   an application data recovery service ADRS interface element and a storage area network (SAN) interface element, a computer network to which it is connected, said SAN interface element comprising subcomponents comprising a SAN Gateway Monitor, a SAN Gateway Controller and a SAN QoS Analyzer;
   said ADRS is a client of said RMRS and interacts with RMRS over the Internet for scheduling I/O intensive backup and recovery I/O tasks associated with multiple applications hosted by a Service Provider;
   a scheduler/optimizer handler element and a RMRS repository element having contents, each connected to said ADRS interface and to each other, said scheduler/optimizer handler element responsive to both said ADRS interface and to said contents of said RMRS repository element;
   a SAN Gateway handler which is connected to said SAN interface and to said scheduler/optimizer handler element and said RMRS repository element, said SAN Gateway handler responsive to scheduling information provided by said scheduler/optimizer handler element; and
   a schedule adjuster and a schedule optimizer each connected to said RMRS repository element and to said scheduler/optimizer handler element; said schedule adjuster and said schedule optimizer providing adjusted and optimized schedule information to said schedule/optimizer handler element;
   wherein said ADRS interface uses a computer network to communicate with ADRS and/or hosted applications;
   said schedule handler interacts with said RMRS repository, said schedule optimizer and said schedule adjuster;
   said schedule optimizer and said schedule adjuster communicate with said RMRS repository and with said schedule handler;
   said RMRS repository also interacts with said SAN Gateway Handler component which in turn interacts with said SAN Gateway via said SAN interface;
   deploying said RMRS as a web service wherein its services are accessed over a network using web services invocation protocols;
   using interfaces provided by RMRS, said ADRS invokes at least one RMRS APIs to convey to RMRS information related to dynamic changes in I/O requirements taking place in response to changes in the state of hosted applications.

41. A system comprising a Resource Management and Reservation System (RMRS) for managing and reserving storage bandwidth by controlling storage access requests which provides an interface to applications, said system having:
   a computer network to which it is connected
   an application data recovery service (ADRS) interface element and a storage area network (SAN) interface element, said SAN interface element comprising subcomponents comprising a SAN Gateway Monitor, a SAN Gateway Controller and a SAN QoS Analyzer;

a scheduler/optimizer handler element and a RMRS repository element having contents, each connected to said ADRS interface and to each other, said scheduler/optimizer handler element responsive to both said ADRS interface and to said contents of said RMRS repository element;

a SAN Gateway handler which is connected to said SAN interface and to said scheduler/optimizer handler element and said RMRS repository element, said SAN Gateway handler responsive to scheduling information provided by said scheduler/optimizer handler element; and a schedule adjuster and a schedule optimizer each connected to said RMRS repository element and to said scheduler/optimizer handler element; said schedule adjuster and said schedule optimizer providing adjusted and optimized schedule information to said schedule/optimizer handler element scheduler/optimizer handler element responsive to both said ADRS interface and to said contents of said RMRS repository element;

a SAN Gateway handler which is connected to said SAN interface and to said scheduler/optimizer handler element and said RMRS repository element, said SAN Gateway handler responsive to scheduling information provided by said scheduler/optimizer handler element; and a schedule adjuster and a schedule optimizer each connected to said RMRS repository element and to said scheduler/optimizer handler element; said schedule adjuster and said schedule optimizer providing adjusted and optimized schedule information to said schedule/optimizer handler element;

said RMRS interfaces with said SAN Gateway via said SAN Interface component and said SAN Gateway manages and controls I/O streams with associated I/O requests such that at a point in time when a backup or recovery task is initiated, two logical I/O stream connections are managed by said SAN Gateway.

42. A system comprising a Resource Management and Reservation System (RMRS) for managing and reserving storage bandwidth by controlling storage access requests which provides an interface to applications, said system having:

a computer network to which it is connected;

an application data recovery service ADRS interface element and a storage area network (SAN) interface element, said SAN interface element comprising subcomponents comprising a SAN Gateway Monitor, a SAN Gateway Controller and a SAN QoS Analyzer;

a scheduler/optimizer handler element and a RMRS repository element having contents, each connected to said ADRS interface and to each other, said scheduler/optimizer handler element responsive to both said ADRS interface and to said contents of said RMRS repository element;

a SAN Gateway handler which is connected to said SAN interface and to said scheduler/optimizer handler element and said RMRS repository element, said SAN Gateway handler responsive to scheduling information provided by said scheduler/optimizer handler element; and a schedule adjuster and a schedule optimizer each connected to said RMRS repository element and to said scheduler/optimizer handler element; said schedule adjuster and said schedule optimizer providing adjusted and optimized schedule information to said schedule/optimizer handler element;

said SAN Gateway Monitor periodically monitors information from an ASG defined at said SAN Gateway; and said monitored information is stored in a ResourceUsageMonitor table in a repository and said Event generator scans Taskschedule and APPLICATIONRESOURCEUSAGE tables stored in an RMRS Repository.

* * * * *